(12) United States Patent
Toda et al.

(10) Patent No.: US 7,429,351 B2
(45) Date of Patent: Sep. 30, 2008

(54) METHOD FOR MANUFACTURING A POROUS CERAMIC STRUCTURE

(75) Inventors: Yumi Toda, Neyagawa (JP); Yukihisa Wada, Nisshin (JP); Yasushi Noguchi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 538 days.

(21) Appl. No.: 10/896,963

(22) Filed: Jul. 23, 2004

(65) Prior Publication Data
US 2005/0046063 A1    Mar. 3, 2005

Related U.S. Application Data

(63) Continuation of application No. 10/330,238, filed on Dec. 30, 2002, now abandoned.

(30) Foreign Application Priority Data
Jan. 21, 2002    (JP) .............................. 2002-012115

(51) Int. Cl.
B28B 3/20    (2006.01)
(52) U.S. Cl. .................... 264/630; 264/44; 264/628; 264/631

(58) Field of Classification Search ............... 264/44, 264/628, 630, 631
See application file for complete search history.

(56) References Cited

U.S. PATENT DOCUMENTS

| 5,256,347 | A | 10/1993 | Miyahara ................ 264/406 |
| 5,592,686 | A | 1/1997 | Third et al. .................. 419/2 |
| 6,254,962 | B1 | 7/2001 | Izumi et al. ................ 428/116 |
| 6,773,481 | B2 * | 8/2004 | Noguchi et al. ............... 55/523 |
| 6,803,086 | B2 * | 10/2004 | Noguchi et al. ............ 428/116 |
| 2003/0034586 | A1 | 2/2003 | Makino et al. ............... 264/211 |
| 2004/0051196 | A1 * | 3/2004 | Otsuka et al. ................. 264/41 |

FOREIGN PATENT DOCUMENTS
EP    0753490 A1 *    1/1997

* cited by examiner

*Primary Examiner*—Carlos Lopez
*Assistant Examiner*—Russell J Kemmerle, III
(74) *Attorney, Agent, or Firm*—Oliff & Berridge, PLC

(57)    ABSTRACT

A method for manufacturing a porous ceramic structure which can produce a high porosity ceramic structure as well as a low porosity ceramic structure without causing cracks at the time of firing. A method for manufacturing a porous ceramic structure comprising molding a raw material which contains a ceramic material as a main component and a pore-forming agent and then drying and firing the obtained molded article. When the molded article is fired, the temperature of a firing environment is raised substantially in synchronization with the temperature of the central portion of the molded article within a temperature range in which at least a portion of the molded article is shrunk by firing.

15 Claims, 6 Drawing Sheets

METHOD FOR MANUFACTURING A POROUS CERAMIC STRUCTURE

CROSS-REFERENCE TO RELATED APPLICATION

This is a Continuation-In-Part of application Ser. No. 10/330,238, filed Dec. 30, 2002, the disclosure of which is incorporated by reference herein in its entirety.

BACKGROUND OF THE INVENTION

1. Field of Invention

The present invention relates to a method for manufacturing a porous ceramic structure. More specifically, the present invention relates to a method for manufacturing a porous ceramic structure wherein a temperature rising rate of a firing environment is controlled at the time of firing a molded article formed from a puddle containing a ceramic material as a main component so as to suppress occurrence of cracks in the fired molded article. The present method can be applied to the production of a variety of porous ceramic structures. Particularly, it is suitable for production of a porous honeycomb structure having a higher porosity in which the increase of the internal temperature of a molded article is quite striking, the increase being caused by the combustion of a pore-forming agent that is concurrently contained in a molded article at the time of firing the molded article.

2. Description of Related Art

A porous ceramic honeycomb structure is widely used as means for collecting and removing particulate substances discharged from a diesel engine and the like. In recent years, with respect to the porous ceramic honeycomb structure, an increase in porosity is in progress in response to such requests as a reduction in pressure loss and an improvement in collection efficiency. Thus, a porous ceramic honeycomb structure having a porosity of 40% or more has been gradually becoming a mainstream.

Heretofore, as a method for manufacturing a porous honeycomb structure, a method comprising the steps of forming a molded article by molding a raw material containing a pore-forming agent, and then drying and firing the molded article is widely practiced. Further, carbon or the like has been mainly used as a pore-forming agent due to its lower generation of combustion heat and the like. However, an increase in the amount of the pore-forming agent to be added or the concurrent use of a pore-forming agent capable of forming a higher porosity, such as a foamable resin, is currently in progress in response to the above requests.

However, it has been found that cracks of unknown causes are formed in an obtained ceramic structure, when a molded article containing an increased amount of pore-forming agent such as carbon, or further containing a foamable resin and the like in response to such a request of higher porosity, is fired in accordance with the same temperature raising program as conventionally used. The occurrence of the cracks is a new problem in production of a high porosity ceramic structure.

SUMMARY OF THE INVENTION

The present invention has been made in view of the above problem. Thus, an object of the present invention is to provide a method for manufacturing a porous ceramic structure which can manufacture a ceramic structure having a higher porosity, and a ceramic structure having a relatively lower porosity as well, without forming cracks at the time of firing.

The present inventors have made intensive studies so as to solve the above problem. As a result, it has been found that there was observed a large difference in temperature between the central portion of a molded article and external surface thereof in a firing step, when a honeycomb structure manufactured has cracks. Thus, they have investigated the causes of the large difference in temperature, and, as a result, found that a large difference in temperature rising rate exists between the central portion of the molded article and a firing environment. Furthermore, it has been found that the difference in temperature rising rate becomes significant particularly when carbon and a pore-forming agent which burns at a relatively lower temperature are concurrently used so as to make the honeycomb structure highly porous. This is because pores are already formed at a temperature where carbon starts to burn, so that combustion of carbon is accelerated, and resultantly the temperature of the central portion of the honeycomb structure is apt to increase easily.

Further, as a result of further studies, it has been further found that a molded article is shrunk only at a portion that reaches a particular temperature range of 800° C. to 1,200° C., for example, when a molded article manufactured from a cordierite-forming raw material is fired. That is, it has been found that cracks are formed at a portion of the molded article which has reached this temperature range earlier than other portion thereof due to the difference in the shrinkage due to firing, when such a temperature difference as mentioned above appears between those portions. This is because a thermal shrinkage in the molded article occurs at a portion whose temperature reaches fast to a temperature at which the thermal shrinkage starts to occur, prior to the other portion whose temperature does not reach such one.

Finally, further intensive studies have been made based on the results of these studies. Accordingly, it has been found that the above problem can be solved by controlling the kind and the amount of the pore-forming agent and the temperature rising rate, taking into consideration the volume of the molded article and the content of oxygen in the firing environment so as to make temperature of the central portion of the molded article substantially synchronized with temperature of the firing environment at the time of firing it within the above-mentioned temperature range causing the shrinkage due to firing. The present invention has been completed based on this finding.

That is, according to the present invention, there is provided a method for manufacturing a porous ceramic structure, comprising the steps of forming a molded article using a raw material containing a ceramic material as a main component and a pore-forming agent, and drying and firing the obtained molded article, wherein temperature of a firing environment is raised substantially in synchronization with the temperature of the central portion of the molded article within a temperature range causing shrinkage due to firing on at least a portion of the molded article during firing of the molded article.

Further, according to the present invention, there is provided a method for manufacturing a porous ceramic structure which comprises the steps of forming a molded article using a raw material containing a cordierite-forming raw material as a main component and a pore-forming agent, and drying and firing a thus formed molded article, wherein the temperature of a firing environment is raised by controlling a temperature of firing environment within a range of −150° C. to +50° C. from the temperature of a central portion of a molded article, during the step of firing the molded article within a temperature range in which at least a portion of the molded article reaches 800° C. to 1,200° C.

In the present invention, it is preferred that the temperature of the central portion of a molded article is controlled by adjusting the amount of a pore-forming agent. To be more specific, the kind of the pore-forming agent varies, depending on a raw material used. In the case of a molded article molded from a puddle of a cordierite-forming raw material, for example, it is preferred that the temperature of the central portion of the molded article is controlled by adjusting the amount of a pore-forming agent which burns at 400° C. to 1,200° C. Further, in case of such a molded article, it is more preferred that the temperature of the central portion of the molded article is controlled by adjusting the amount of a pore-forming agent burning at 400° C. to 1,200° C., and that the porosity of the fired molded article is controlled by adjusting the amount of the pore-forming agent burning at 400° C. to 1,200° C. and the amount of a pore-forming agent burning at a temperature below 400° C.

In the present invention, carbon is preferred as a pore-forming agent burning at 400° C. to 1,200° C. since it generates only a low amount of heat. Further, as a pore-forming agent which burns at temperatures below 400° C., at least one member selected from the group consisting of wheat flour, starch, a phenol resin, a foamable resin, a foamed resin, a polymethyl methacrylate and a polyethylene terephthalate may be used.

In the present invention, the molded article preferably contains 5 to 25 parts by mass of carbon and 1 to 5 parts by mass of a foamable resin or a foamed resin based on 100 parts by mass of the cordierite-forming raw material.

Further, in the present invention, the molded article is preferably fired by raising temperature of firing environment at a rate of 10 to 80° C./hr when the temperature is within a range of 400° C. and 1,200° C. In addition, the firing environment in which the molded article is fired preferably contains 7 to 17% by volume of oxygen when the temperature is within a range of 400° C. and 1,200° C.

Further, the method according to the present invention can be particularly preferably used for a honeycomb structure among porous ceramic structures.

Next, the basic principle of a firing step in the method according to the present invention will be described with reference to FIGS. 1 to 3. FIG. 1 is a graph showing an example in which the temperature of the central portion of a molded article remains constantly higher than the temperature of a firing environment in a firing step. Conversely, FIG. 2 is a graph showing an example in which the temperature of the central portion of a molded article remains constantly below the temperature of a firing environment. Meanwhile, FIG. 3 is a graph showing an example in which the temperature of the central portion of a porous ceramic structure remains almost the same as the temperature of a firing environment. These figures show examples in which molded articles each formed from a puddle containing a cordierite-forming raw material as a main component and carbon (activated carbon) as a pore-forming agent were fired. In these figures, the dotted line represents temperature of the central portion of the molded article, and a solid line represents temperature of firing environment, respectively.

Firstly, the example shown in FIG. 1 is observed when a molded article containing a large amount of pore-forming agent such as carbon is fired. It shows that once firing temperature reaches the temperature (in FIG. 1, about 400° C. corresponds to this temperature) at which the pore-forming agent can burn, the temperature of the central portion of the molded article changes while keeping it higher than the temperature of firing environment. This comes the fact that the heat generated by combustion of the pore-forming agent is accumulated inside the molded article, and the temperature of the central portion of the molded article is always kept higher than the temperature of firing environment until the pore-forming agent is burned out. This is because the combustion of the pore-forming agent is accelerated with the elevation of temperature.

Meanwhile, when a molded article comprising a cordierite-forming raw material reaches a temperature range of 800° C. to 1,200° C., shrinkage due to firing suddenly occurs. Hence, the inside of the molded article reaches this temperature range earlier than its outside does, and it shrinks due to firing of a partition wall earlier than its outside, whereby tensile stress is produced between these portions. When the tensile stress is significant, cracks are formed in a ceramic structure to be manufactured.

Next, the example shown in FIG. 2 is a case wherein temperature of the central portion of a molded article remains constantly below the temperature of a firing environment. This occurs, for example, when the molded article is large in size or the temperature rising rate of firing environment is extremely high. This occurs when the temperature rising rate of firing environment becomes much higher than the rate at which heat of a firing environment is transferred from the external surface to inside of the molded article. In such a case, the outer walls of the molded article reach temperature range of 800° C. to 1,200° C. at which the shrinkage due to firing occurs earlier than its inside. Consequently, the outer walls of the molded article shrink due to firing before the inner walls of the molded article start to shrink, whereby tensile stress is produced between the portions. When the tensile stress is significant, cracks are formed on the outer walls of a ceramic structure to be obtained.

In contrast, the example shown in FIG. 3 is a case according to the present invention in which a molded article is fired by raising temperature of a firing environment substantially in synchronization with temperature of the central portion of a molded article, when temperature is within a temperature range in which at least a portion of the molded article undergoes shrinkage due to firing. In this case, comprehensive consideration is made on the factor(s) which make(s) temperature of the central portion of the molded article higher than temperature of a firing environment and the factor(s) which make(s) temperature of the central portion of the molded article below temperature of a firing environment.

In such firing step, the outer portion and inner portion of the molded article undergo shrinkage due to firing almost concurrently, so that almost no difference in shrinkage between the inner portion and the outer portion of the molded article can be observed. Therefore, tensile stress is not produced between the inner portion and the outer portion of the molded article, and no cracks are formed in a ceramic structure to be formed.

DETAILED DESCRIPTION OF PREFERRED EMBODIMENTS

Figure 1:
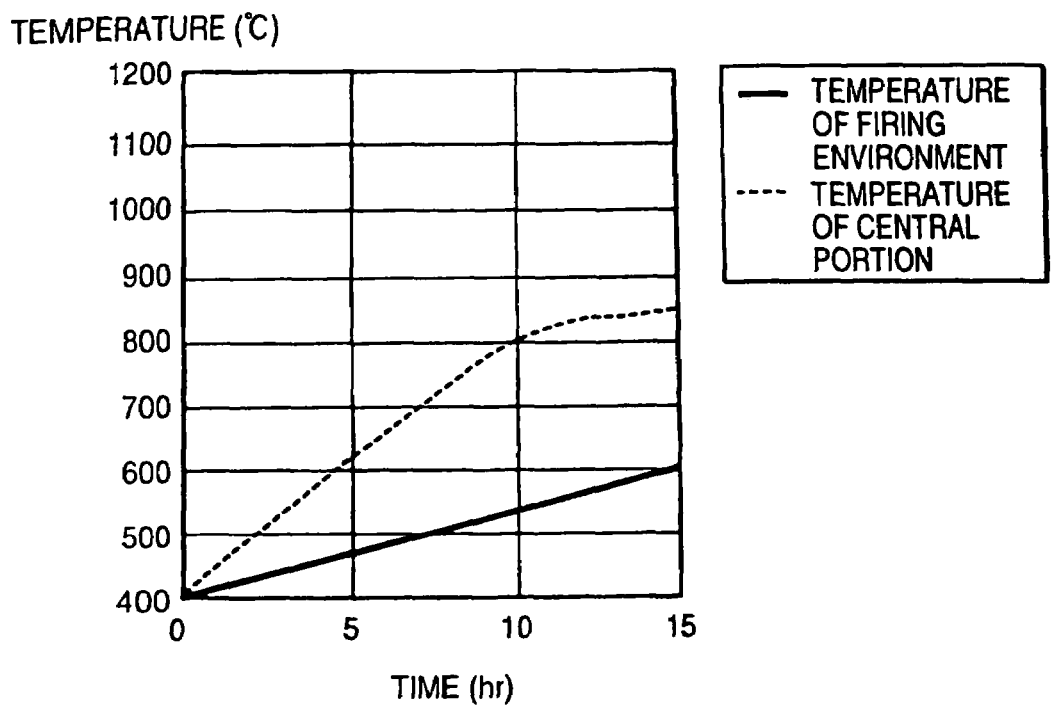
FIG. 1 is a graph illustrating an example in which temperature of the central portion of a molded article becomes higher than temperature of a firing environment in a firing step.
Figure 2:
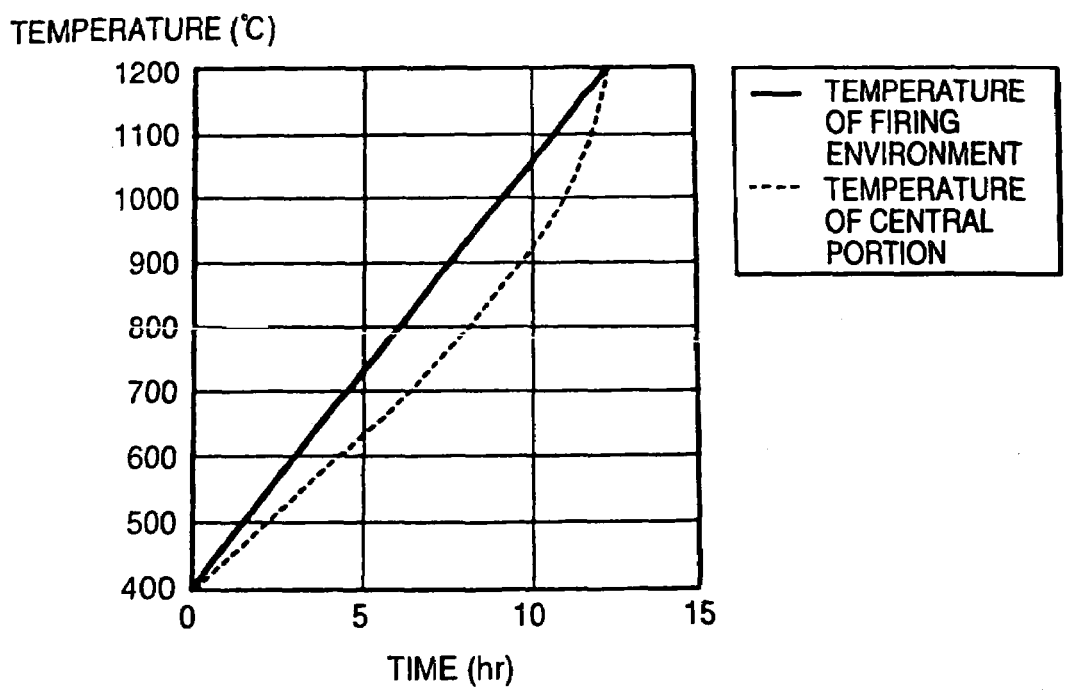
FIG. 2 is a graph illustrating an example in which temperature of the central portion of the molded article becomes lower than temperature of a firing environment in firing step.
Figure 3:
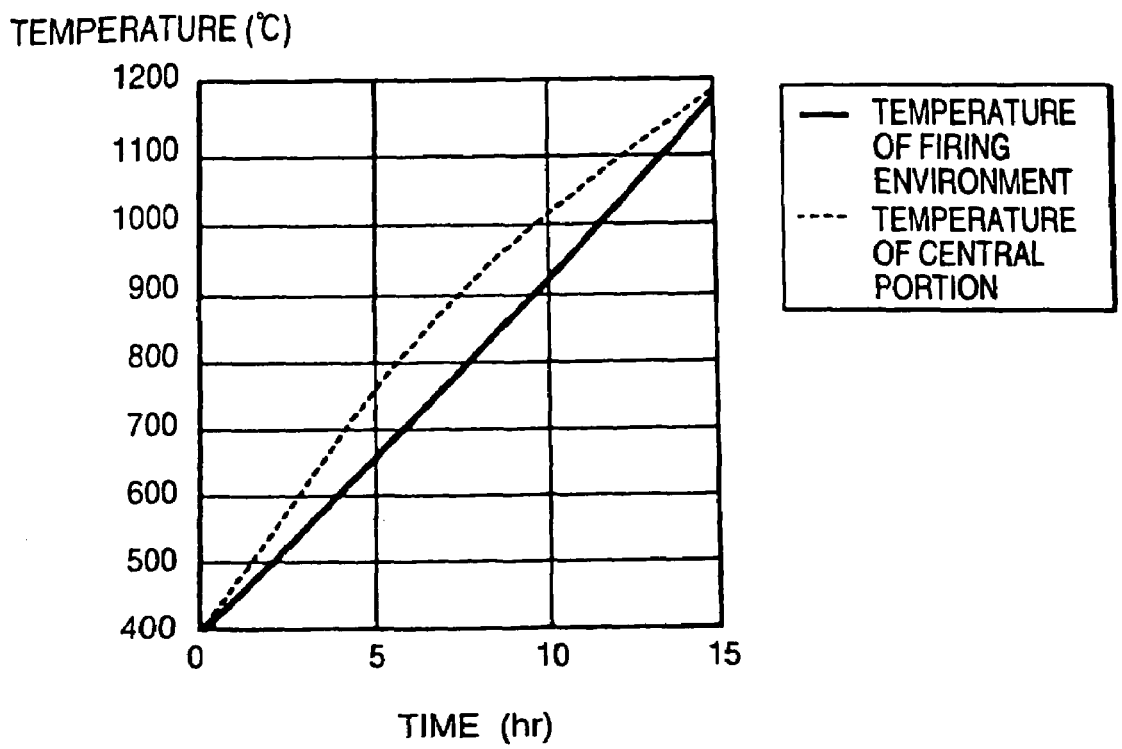
FIG. 3 is a graph illustrating an example in which temperature of the central portion of the molded article nearly corresponds to temperature of a firing environment in firing step.

Hereinafter, each step in an embodiment of the present invention will be described in detail.

In the method according to the present invention, firstly, a molded article is manufactured from a raw material containing a ceramic raw material as a main component and a pore-forming agent and then dried.

In the present invention, the ceramic raw material is not particularly limited and may be a cordierite-forming raw material, alumina or zirconium phosphate, for example.

When the cordierite-forming raw material is used as the ceramic raw material, those which are generally obtained by mixing a silica ($SiO_2$) source component such as kaolin, talc, quartz, fused silica or mullite; a magnesia (MgO) source component such as talc or magnesite; and an alumina ($Al_2O_3$) source component such as kaolin, aluminum oxide or aluminum hydroxide so as to attain theoretical composition of a cordierite crystal can be used. However, for some applications, those whose compositions are deliberately changed from the theoretical composition or those which contain mica, quartz, $Fe_2O_3$, CaO, $Na_2O$ or $K_2O$ as an impurity may also be used. Alternatively, those having types, proportions or particle diameters of constituents controlled while maintaining the theoretical composition so as to control porosity and a pore diameter of a filter to be obtained may also be used.

Further, illustrative examples of a pore-forming agent used in the present invention include carbon such as graphite and activated carbon, a foamed resin such as an acrylic microcapsule, a foamable resin, wheat flour, starch, a phenol resin, a polymethyl methacrylate, a polyethylene, and a polyethylene terephthalate. The relationship between the pore-forming agent and conditions for firing will be described later.

In the present invention, as required, other additives such as a molding assistant, a binder and a dispersing agent may be included.

Illustrative examples of the molding assistant include stearic acid, oleic acid, a potassium laurate soap, ethylene glycol, and trimethylene glycol. Illustrative examples of the binder include hydroxypropyl methyl cellulose, methyl cellulose, hydroxyethyl cellulose, carboxylmethyl cellulose, and a polyvinyl alcohol. Illustrative examples of the dispersant include dextrin, a fatty acid soap, and a polyalcohol. These additives can be used solely or in combination of two or more according to purposes.

In the present invention, a method of preparing a molded article is also not particularly limited, and a preferable method may be used as appropriate. For example, a honeycomb structure to be used as an exhaust gas purification filter can be manufactured by kneading together 5 to 40 parts by mass of pore-forming agent, 10 to 40 parts by mass of water, and as required, 3 to 5 parts by mass of a binder and 0.5 to 2 parts by mass of a dispersing agent based on 100 parts by mass of a cordierite-forming raw material, forming the mixture into a cylindrical puddle by means of, for example, a vacuum kneading machine to mold a puddle as a green honeycomb structure.

Further, as a method of molding the puddle, extrusion molding, injection molding or press molding may be used, for example. Of these, it is preferable to mold the puddle by extrusion molding in that the method facilitates continuous molding and can orient ceramic crystals so as to impart low thermal expandability to the structure.

In addition, as a method of drying the molded article, hot air drying, microwave drying, dielectric drying, drying under reduced pressure, vacuum drying or freeze-drying may be used, for example. It is preferable to select an appropriate method according to a ceramic raw material used. In the case that a molded article comprises a cordierite-forming raw material as a main component, it is preferable to dry a molded article by employing a drying step comprising a combination of hot air drying and microwave drying or dielectric drying. This is because the molded article can be dried quickly and uniformly as a whole.

Then, in the method according to the present invention, the molded article is fired, with raising temperature of a firing environment by substantially synchronizing it with temperature of the central portion of the molded article when temperature is within a temperature range in which at least a portion of the molded article undergoes shrinkage due to firing.

Thereby, no tensile stress is produced between portions of the molded article at the time of firing, so that a ceramic structure having a higher porosity can be obtained without forming cracks on the molded article.

Hereinafter, the term "central portion" refers to wall portions at the vicinity of the central axis of a honeycomb structure.

Further, note that the term "temperature range in which at least a portion of a molded article is thermally shrunk" differs, depending on a raw material constituting the molded article. For example, the temperature range is 800° C. to 1,200° C. for a molded article comprising a cordierite-forming raw material as a main component, and 1,000° C. to 1,200° C. for a molded article comprising zirconium phosphate as a main component.

In addition, the term "substantially synchronizing with" is meant to raise temperature of firing environment within a range in which the suppressive effect of crack formations can be attained, with controlling temperature of a firing environment within a specific range, with relation to temperature of the central portion of the molded article. More specifically, although the specific range more or less differs depending on the shrinkage rate of a raw material constituting the molded article, it is a temperature range of about −150° C. to about +50° C. from temperature of the central portion of the molded article.

Hence, when a molded article comprising a cordierite-forming raw material as a main component is fired in the present invention, temperature of a firing environment is raised within a temperature range in which at least a portion of the molded article reaches 800° C. to 1,200° C., while the temperature of a firing environment is controlled to one within a temperature range of preferably −150° C. to +50° C., more preferably −120° C. to +30° C., particularly preferably −100° C. to +20° C. from temperature of the central portion of the molded article.

In the present invention, as a method of synchronizing temperature of a firing environment with temperature of the central portion of a molded article, the following methods would be illustrated. That is, one is a method in which temperature of the central portion of a molded article is measured and a firing environment is caused to follow the measured temperature of the central portion of the molded article. Another one is a method in which experimental firing is carried out in advance to determine a temperature raising program in order to make temperature of a firing environment synchronized with temperature of the central portion of a molded article from the result of the experimental firing, and then the molded article is fired in accordance with the program thus obtained. Of the two methods, the latter method is preferred from the viewpoint of ease of use.

However, in any methods, the temperature rising rate of firing environment is preferably set such that it can be controlled easily. More specifically, the temperature of firing environment is preferably raised at a rate of 10 to 80° C./hr when the temperature is within a temperature range from the temperature at which a pore-forming agent which burns at 400° C. or higher among pore-forming agents used starts to fire to a temperature at which shrinkage due to firing of the molded article ceases. For example, when a molded article containing a cordierite-forming raw material as a main component and carbon as a pore-forming agent is fired, the temperature of a firing environment is preferably raised at a rate of 10 to 80° C./hr when the temperature is within a range of 400° C. to 1,200° C., although the temperature rising rate and the temperature range differ depending on the type of carbon, the size of the molded article and other factors.

On the other hand, a difference in temperature between the central portion of the molded article and firing environment is also influenced by such factors as the kind or content of the pore-forming agent, the content of oxygen in a firing environment and the shape or size of the molded article in addition to the temperature rising rate of a firing environment. Thus, it is preferable to adjust at least one of these factors so as to make the temperatures synchronized with each other, since this can make the temperature rising rate of firing environment easy to control.

Particularly, in the present invention, it is preferable to include a temperature control method in which the amount of pore-forming agent burning within a range of at least 400° C. to 1,200° C. is adjusted. This is because this method may fire a plural number of molded articles even having different volumes simultaneously, which is extremely advantageous from the viewpoint of production efficiency.

In the present invention, carbon is preferred as the pore-forming agent burnable within a range of 400° C. to 1,200° C. This is because the rigidity of a molded article at the time of firing can be still retained due to the presence of the residual pore-forming agent, even after the pore-forming agent burnable at a temperature below 400° C. is burned out completely, if carbon is used in combination with a pore-forming agent burnable at temperatures below 400° C. Indeed, the strength of the molded article is more or less lowered due to the burning out of the pore-forming agent burnable at a temperature below 400° C. Further, illustrative examples of carbon include graphite and activated carbon. For example, activated carbon can be used as a pore-forming agent burnable within a range of 400° C. to 1,200° C., and graphite can be used as a pore-forming agent burnable within a range of 600° C. to 1,200° C.

Further, when carbon is used as a pore-forming agent, it is preferred that carbon may be contained in an amount of 5 to 25 parts by mass based on 100 parts by mass of the cordierite-forming material in order to control easily the difference in temperature between a firing environment and the central portion of the molded article by using heat generated at the time of firing.

As described above, however, a suitable amount of carbon to be added varies relative to other factors associated with the difference in temperature between the central portion of the molded article and firing environment.

Figure 4:
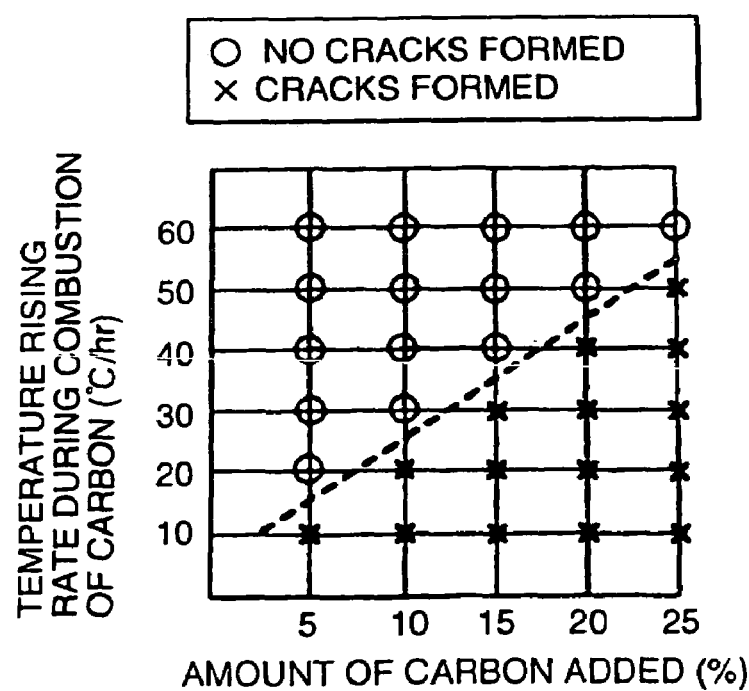
FIG. 4 is a graph illustrating a relationship between a temperature rising rate within the temperature range from 400° C. to 1,200° C. and an amount of carbon added, when a molded article having a volume of 3 L is fired.
Figure 5:
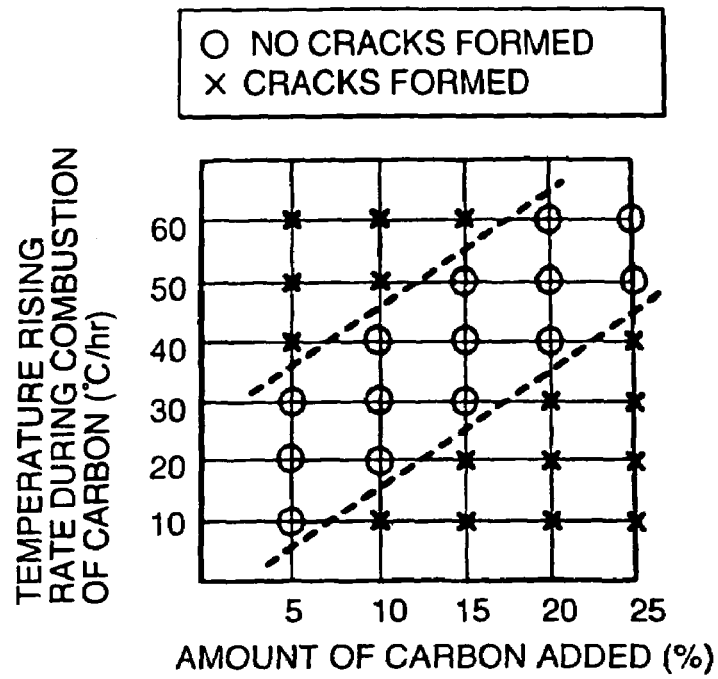
FIG. 5 is a graph illustrating a relationship between a temperature rising rate within the temperature range from 400° C. to 1,200° C. and an amount of carbon added, when a molded article having a volume of 15 L is fired.
Figure 6:
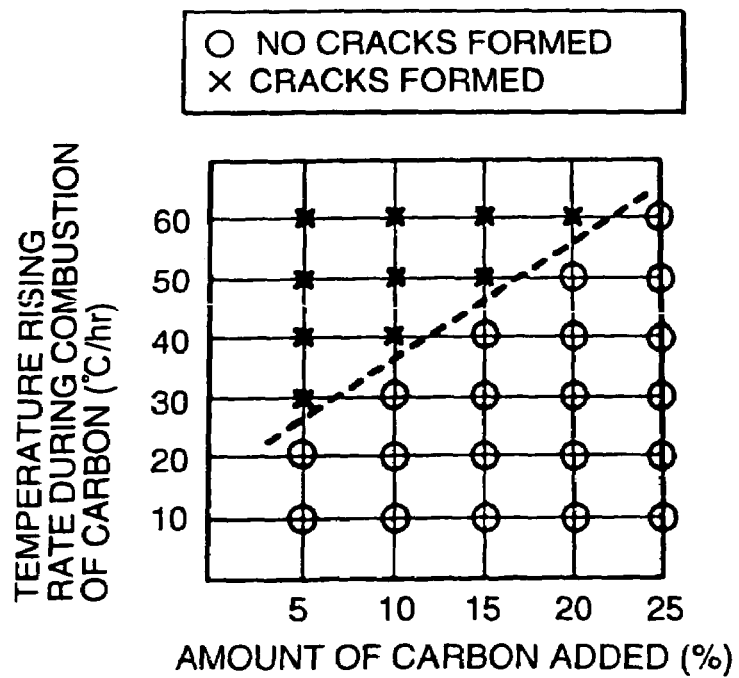
FIG. 6 is a graph illustrating a relationship between a temperature rising rate within the temperature range from 400° C. to 1,200° C. and an amount of carbon added, when a molded article having a volume of 28 L is fired.

Hence, with reference to specific examples, a suitable amount of carbon to be added in a relationship between the volume of a molded article and the temperature rising rate of an atmosphere will be discussed hereinafter. FIGS. 4 to 6 are graphs showing relationships between the amount of carbon added and the temperature rising rate of firing environment when molded articles having volumes of 3 L, 15 L and 28 L (which are apparent volumes with spaces such as breakthroughs ignored) are fired.

Firstly, as shown in FIG. 4, when a molded article having a volume of 3 L is fired, a ceramic structure having no cracks can be obtained when temperature rising rate (y) of a firing environment and an added carbon amount (x) satisfy a relationship defined by the following relational expression (1):

$$y \geq 2x+10 \quad (1).$$

Similarly, as shown in FIG. 5, when a molded article having a volume of 15 L is fired, a ceramic structure having no cracks can be obtained when a temperature rising rate (y) of a firing environment and an added carbon amount (x) satisfy relationships represented by the following relational expressions (2) and (3):

$$y \geq 2x \quad (2), \text{ and}$$

$$y \leq 2x+20 \quad (3).$$

Further, as shown in FIG. 6, when a molded article having a volume of 28 L is fired, a ceramic structure having no cracks can be obtained when a temperature rising rate (y) of a firing environment and an added carbon amount (x) satisfy a relationship represented by the following relational expression (4):

$$y \leq 2x+10 \quad (4)$$

Although suitable amounts of carbon to be added have been described above with respect to the relationships between the volume of the molded articles and the temperature rising rate in a firing environment, the same thing may be applicable to other factors; that is, a suitable amount of carbon may differ in accordance with the relationships between the amount of carbon and other factors.

Then, if a molded article comprising a cordierite-forming raw material as a main component is fired according to the present invention, it is preferable to employ a method in which the porosity is adjusted by choosing properly the amount of a pore-forming agent burnable within a range of 400° C. to 1,200° C. and the amount of pore-forming agent burnable at temperatures below 400° C., while controlling a difference in temperature between the central portion of the molded article and a firing environment by the amount of the pore-forming agent burnable within a range of 400° C. to 1,200° C. According to this method, the amount of the pore-forming agent burnable within a range of 400° C. to 1,200° C. can be determined by considering only the difference in temperature between the central portion of the molded article and the firing environment. In addition, since the formation of pores which is not satisfactorily achieved by use of only the pore-forming agent can be complemented by the pore-forming agent which burns at temperatures below 400° C., porosity can be further increased.

In the present invention, as the pore-forming agent which burns at temperatures below 400° C., at least one selected from the group consisting of wheat flour, starch, a phenol resin, a foamable resin, a foamed resin, a polymethyl methacrylate and a polyethylene terephthalate may be used. Of these, the foamable resin or the foamed resin is preferred since an extremely high porosity ceramic structure having a porosity of not below 50% can be obtained with a small amount of the foamable resin or the foamed resin, and the foamed resin such as an acrylic microcapsule is particularly preferred since higher porosity can be attained.

However, when a large amount of foamable resin which burns out at a low temperature of 300° C. to 400° C. is added, a number of pores are already formed by that time a pore-forming agent such as carbon which starts to burn at 400° C. or higher is burned, and the pores cause an environment in which the pore-forming agent can burn easily, thereby making it difficult to control a temperature rising rate. Therefore, the pore-forming agent which burns at temperatures below 400° C. is preferably contained in a puddle in an amount of not larger than 15% by mass, more preferably not larger than 10% by mass.

In the present invention, a difference in temperature between the central portion of a molded article and a firing environment can be controlled by the content of oxygen in firing environment. However, since safety must be considered when the temperature difference is controlled by the content of oxygen in firing environment, the content of oxygen in firing environment is preferably controlled to within a range of 7 to 17% by mass at firing temperatures of 400° C. to 1,200° C.

Although the method for manufacturing of the present invention has been described above, the method for manufacturing of the present invention can be applied to a variety of porous ceramic structures regardless of shape, size, structure and the like. However, since the burning of a pore-forming agent is promoted, it can be particularly preferably used as a method for manufacturing of a porous honeycomb structure with high porosity which is apt to have a large difference in temperature between its central portion and a firing environment.

EXAMPLES

Hereinafter, the present invention will be further described with reference to Examples. However, the present invention shall not be limited by these Examples in any way. The Examples and Comparative Examples were evaluated in the following manner.

(Evaluation Method)

Upon preparations of honeycomb structures based on the Examples and Comparative Examples, temperatures of the central portions of molded articles and temperatures of firing environments were measured by means of an R thermocouple so as to determine differences therebetween. Further, one hundred honeycomb structures manufactured based on each of the Examples and Comparative Examples were observed visually for checking presence and absence of cracks and their locations.

Example 1

Firstly, 39.8 wt % of talc (average particle diameter: 21 μm), 18.5 wt % of kaolin (average particle diameter: 11 μm), 14.0 wt % of alumina (average particle diameter: 7 μm), 15.2 wt % of aluminum hydroxide (average particle diameter: 2 μm), and 12.5 wt % of silica (average particle diameter: 25 μm) were mixed together so as to prepare a cordierite-forming raw material.

Then, a raw material containing 10.0 parts by mass of carbon (average particle diameter: 53 μm), 2.0 parts by mass of foamed resin (average particle diameter: 50 μm), 4 parts by mass of binder, 0.5 parts by mass of surfactant, and 31 parts by mass of water based on 100 parts by mass of the cordierite-forming raw material was charged into a kneader and kneaded for 30 minutes so as to obtain a puddle.

Then, the obtained puddle was charged into a vacuum kneading machine and kneaded into a cylindrical form which was then put in an extruder to be molded into a honeycomb form. Further, after subjected to dielectric drying, the molded article was absolutely dried by hot air drying and then cut to a given size by cutting off both end faces thereof.

Figure 7:
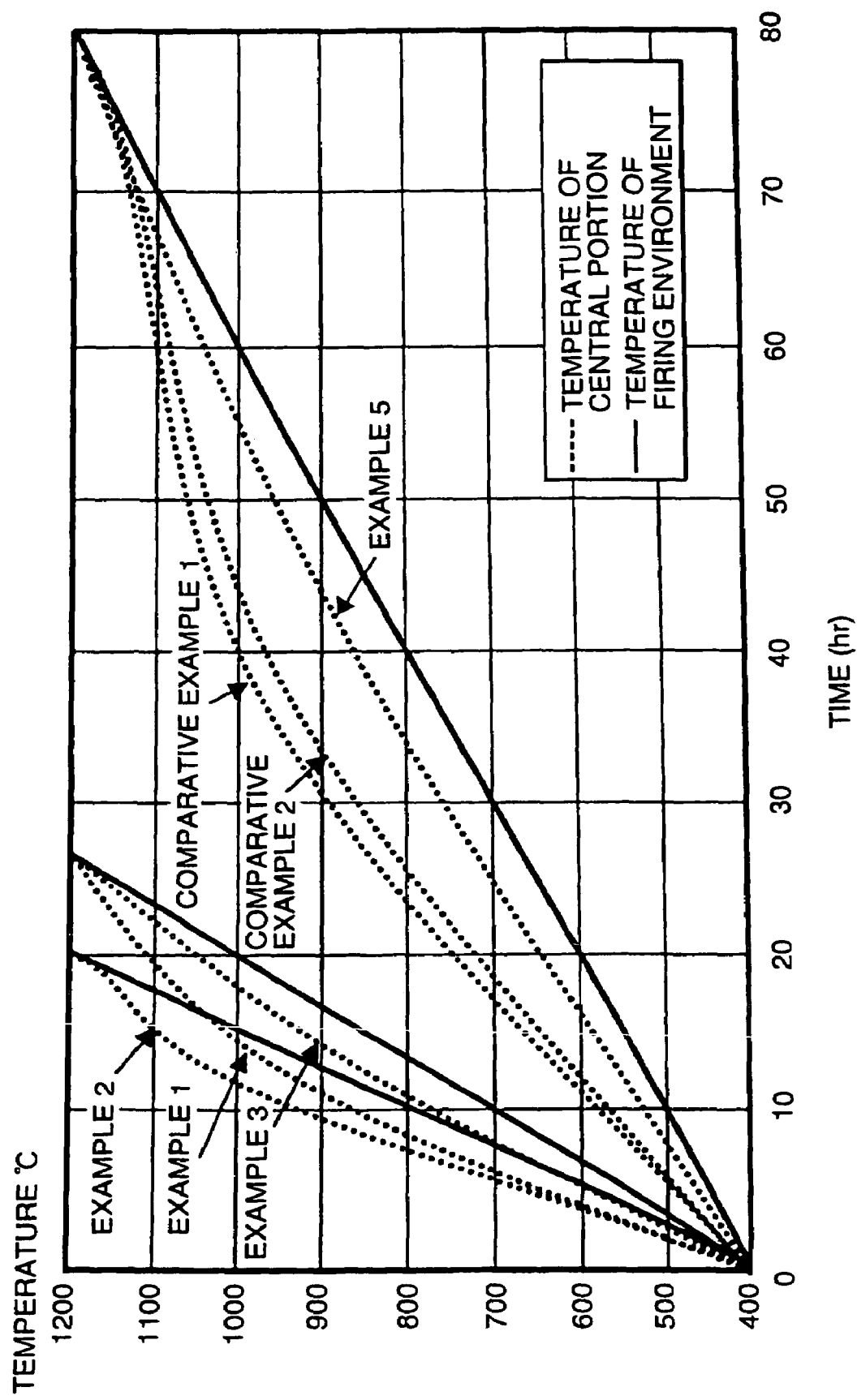
FIG. 7 is a graph illustrating manners in which temperatures of the central portions of molded articles and temperatures of firing environments increased at the time of firing the respective molded articles in Examples and Comparative Examples.

Finally, the resulting molded article was fired in accordance with a temperature raising program No. 3 shown in Table 1 at 400° C. to 1,200° C. (temperatures ranging from a temperature at which carbon starts to burn to a temperature at which shrinkage due to burning becomes unable to occur) with an oxygen concentration in an firing environment of 10 to 15% by volume so as to produce a honeycomb structure having a volume of 3 L (size: φ150 mm×L150 mm), a partition thickness of 300 μm, and 300 cells/inch$^2$ ($46.5 \times 10^{-2}$/mm$^2$). Production conditions and evaluation results are shown in Tables 1 and 2. In addition, manners in which the temperature of the central portion of the molded article and the temperature of firing environment increased are shown in FIG. 7.

Examples 2 to 6 and Comparative Examples 1 to 5

Figure 8:
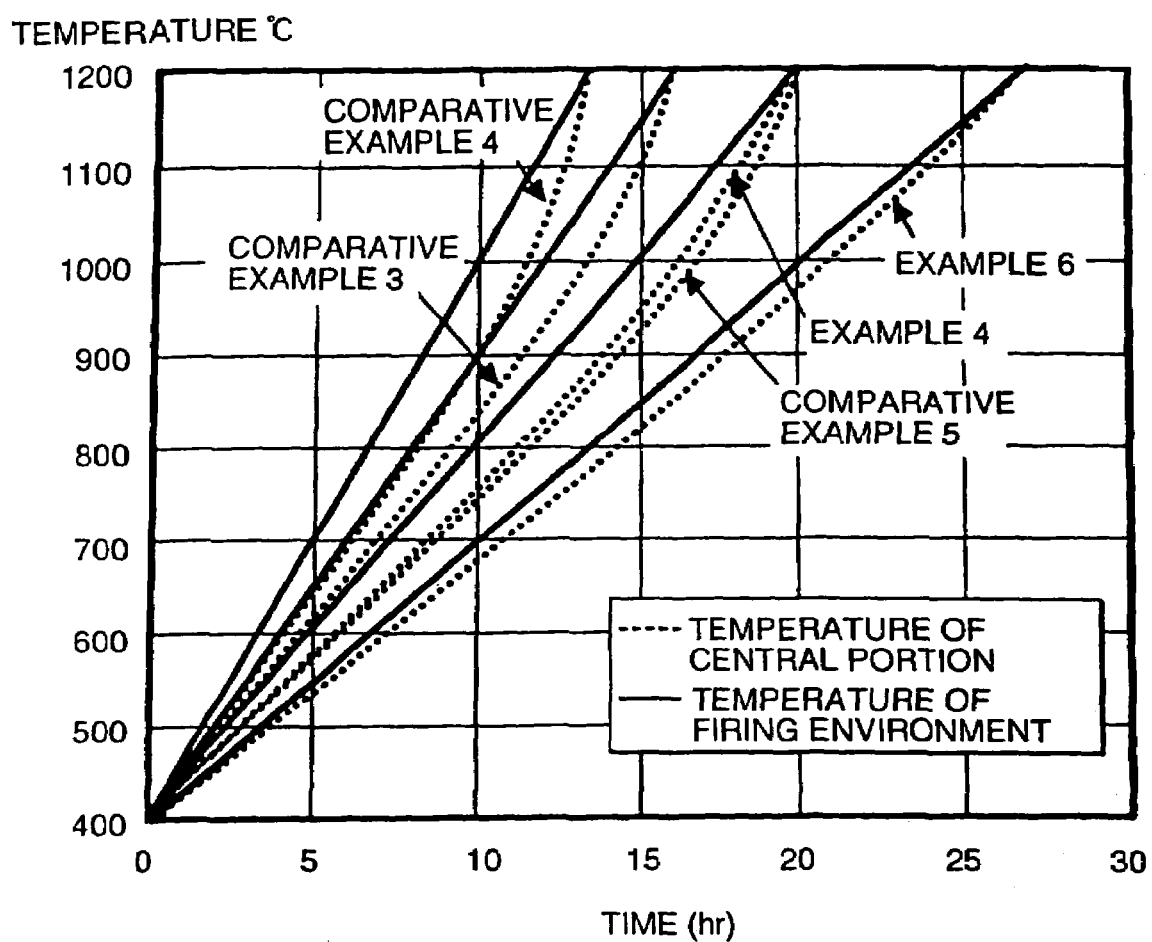
FIG. 8 is a graph illustrating manners in which temperatures of the central portions of molded articles and temperatures of firing environments increased at the time of firing the respective molded articles in Examples and Comparative Examples.

Honeycomb structures were manufactured in the same manner as in Example 1 except that molded articles were fired in accordance with temperature raising programs shown in Tables 1 and 2 and the manufactured honeycomb structures had volumes shown in Table 2 (i.e., 3 L (size: φ150 mm×L150 mm), 15 L (size: φ250 mm×L300 mm) and 28 L (size: φ300 mm×L400 mm)). Production conditions and evaluation results are shown in Tables 1 and 2. In addition, manners in which temperatures of the central portions of the molded articles and temperatures of firing environments increased are shown in FIGS. 7 and 8.

TABLE 1

| Temperature Raising Program | Temperature Rising Rate (° C./hr) 400° C. to 1,200° C. |
| --- | --- |
| No. 1 | 10 |
| No. 2 | 20 |
| No. 3 | 30 |
| No. 4 | 40 |
| No. 5 | 50 |
| No. 6 | 60 |
| No. 7 | 70 |
| No. 8 | 80 |

TABLE 2

| | Vol. | Temp. Raising Program | Difference in Temp. between Firing environment and Central Portion of Molded Article (Max) | Rate of Occurrence of Cracks (%) | Site Where Cracks Occurred |
|---|---|---|---|---|---|
| Com. Ex. 1 | 3 L | No. 1 | −200° C. | 100 | Near Central Portion |
| Ex. 1 | 3 L | No. 3 | −150° C. | 0 | — |
| Ex. 2 | 3 L | No. 4 | −120° C. | 0 | — |
| Ex. 3 | 3 L | No. 6 | −50° C. | 0 | — |
| Com. Ex. 2 | 15 L | No. 1 | −160° C. | 100 | Near Central Portion |
| Ex. 4 | 15 L | No. 4 | 50° C. | 0 | — |
| Com. Ex. 3 | 15 L | No. 5 | 60° C. | 100 | Near External Surface |
| Com. Ex. 4 | 15 L | No. 7 | 100° C. | 100 | Near External Surface |
| Com. Ex. 5 | 15 L | No. 8 | 120° C. | 100 | Near External Surface |
| Ex. 5 | 28 L | No. 1 | −60° C. | 0 | — |
| Ex. 6 | 28 L | No. 3 | 30° C. | 0 | — |

(Evaluation)

As shown in Table 2 and FIGS. 7 and 8, when temperatures of the central portions of molded articles manufactured by manufacturing methods of Comparative Examples 1 and 2 were between 800° C. and 1,200° C., differences between the temperature of firing environment and the temperatures of the central portions of the molded articles were over −150° C. at the maximum. In addition, all hundred of honeycomb structures manufactured by any of the two methods for manufacturing had cracks, mainly near the central portions.

Meanwhile, when temperatures of the central portions of molded articles manufactured by manufacturing methods of Comparative Examples 3, 4 and 5 were between 800° C. and 1,200° C., differences between the temperature of firing environment and the temperatures of the central portions of the molded articles were over +50° C. at the maximum. In addition, all hundred of honeycomb structures manufactured by any of the three method for manufacturing had cracks, mainly near external surfaces.

In contrast, when temperatures of the central portions of molded articles manufactured by methods for manufacturing of Examples 1 to 6 were between 800° C. and 1,200° C., differences between the temperatures of firing environments and the temperatures of the central portions of the molded articles were within the range from −150° C. to +50° C. at the maximum. In addition, all hundred of honeycomb structures manufactured by any of the above manufacturing methods had no cracks, indicating that rates of occurrence of cracks were 0%.

Example 7 and Comparative Examples 6 and 7

Figure 9:
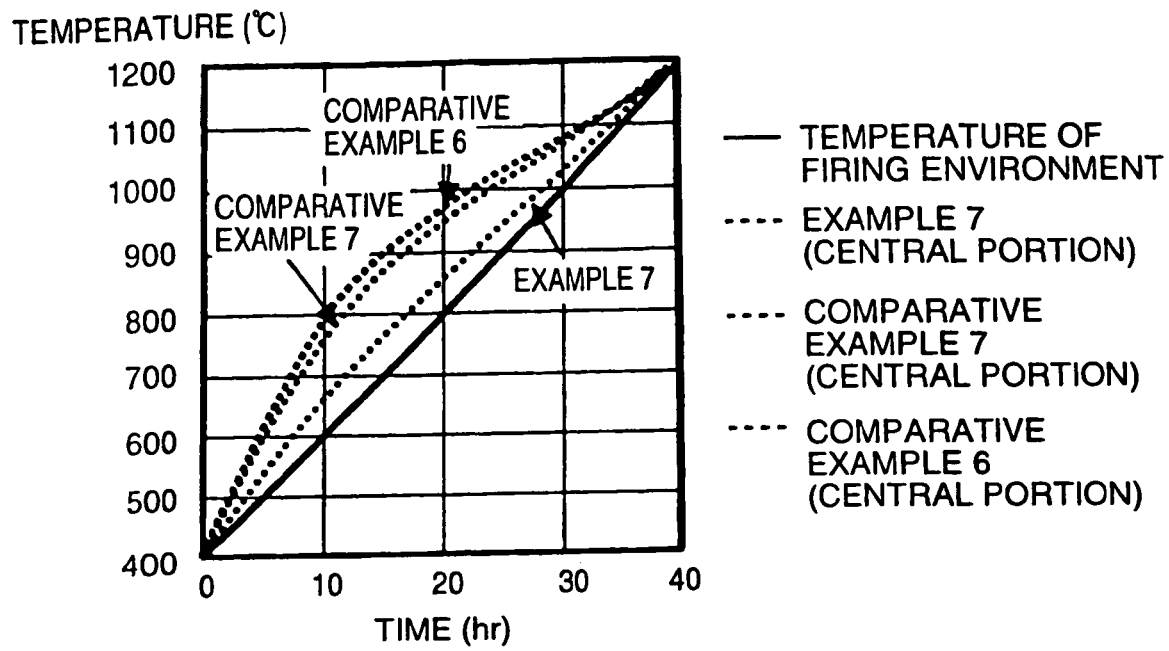
FIG. 9 is a graph illustrating manners in which temperatures of the central portions of molded articles and the temperature of a firing environment increased at the time of firing the respective molded articles in Examples and Comparative Examples.

Honeycomb structures were manufactured in the same manner as in Example 1 except that molded articles were fired in accordance with the temperature raising program 2 shown in Table 1, that a raw material containing 15.0 parts by mass of carbon (average particle diameter: 53 μm) based on 100 parts by mass of the cordierite-forming raw material was used, and that the manufactured honeycomb structures had volumes shown in Table 3 (i.e., 3 L (size: φ150 mm×L150 mm), 15 L (size: φ250 mm×L300 mm) and 28 L (size: φ300 mm×L400 mm)). Production conditions and evaluation results are shown in Table 3. In addition, manners in which temperatures of the central portions of the molded articles and the temperature of a firing environment increased are shown in FIG. 9.

TABLE 3

| | Volume (L) | Amount of carbon Added (Parts by mass) | Temp. Raising Program | Difference in Temp. between Firing environment and Central Portion of Molded Article (Max) | Rate of Occurrence of Cracks (%) | Site Where Cracks Occurred |
|---|---|---|---|---|---|---|
| Com. Ex. 6 | 3 | 15 | No. 2 | −200° C. | 100 | Near Central Portion |
| Com. Ex. 7 | 15 | 15 | No. 2 | −180° C. | 100 | Near Central Portion |
| Ex. 7 | 28 | 15 | No. 2 | −50° C. | 0 | — |

Examples 8 and 9

Figure 10:
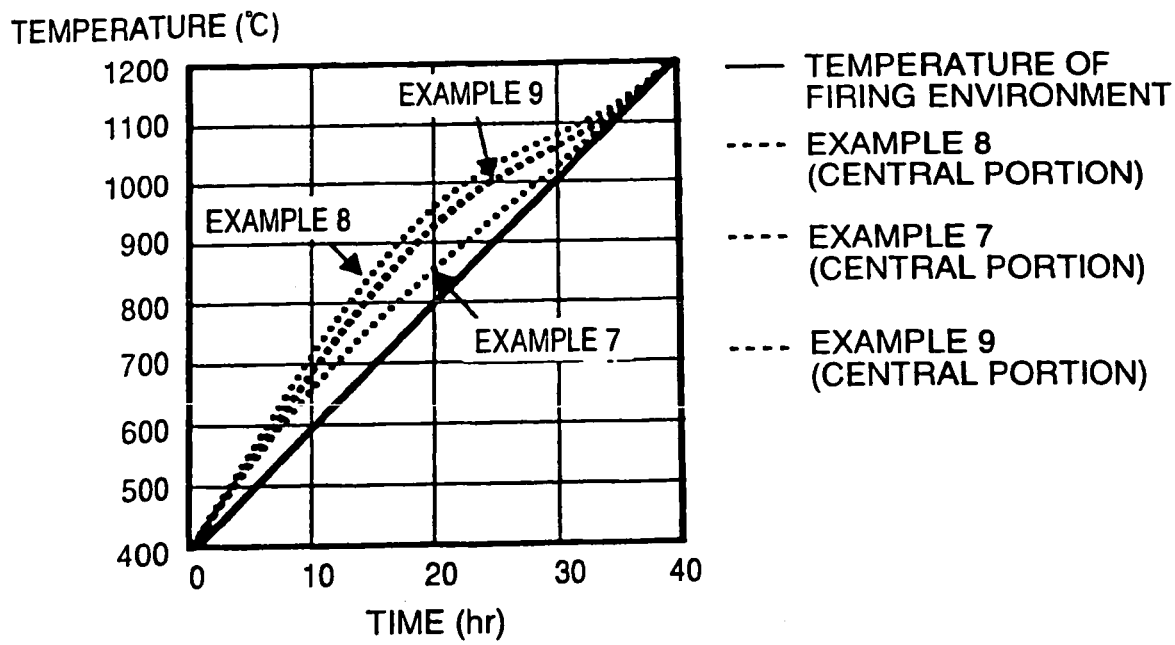
FIG. 10 is a graph illustrating manners in which temperatures of the central portions of molded articles and the temperature of a firing environment increased at the time of the step of firing the molded articles in Examples and Comparative Examples.

Honeycomb structures were manufactured in the same manner as in Example 1 except that molded articles were fired in accordance with the temperature raising program 2 shown in Table 1, that a raw material containing 5.0 or 10.0 parts by mass of carbon (average particle diameter: 53 μm) based on 100 parts by mass of the cordierite-forming raw material was used, and the manufactured honeycomb structures had volumes shown in Table 4 (i.e., 3 L (size: φ150 mm×L150 mm) and 15 L (size: φ250 mm×L300 mm)). Production conditions and evaluation results are shown in Table 4 together with those of Example 7. In addition, manners in which temperatures of the central portions of the molded articles and the temperature of a firing environment increased are shown in FIG. 10.

TABLE 4

|  | Volume (L) | Amount of carbon Added (Parts by +mass) | Temp. Raising Program | Difference in Temp. between External Surface and Central Portion of Molded Article (Max) | Rate of Occurrence of Cracks (%) | Site Where Cracks Occurred |
|---|---|---|---|---|---|---|
| Ex. 8 | 3 | 5 | No. 2 | −150° C. | 0 | — |
| Ex. 9 | 15 | 10 | No. 2 | −120° C. | 0 | — |
| Ex. 7 | 28 | 15 | No. 2 | −50° C. | 0 | — |

(Evaluation)

As shown in Table 3 and FIG. 9, when the molded articles each containing 15 wt % of carbon and having a volume of 3 L, 15 L and 28 L, respectively, were fired in accordance with the temperature raising program 2 (at 400° C. to 1,200° C. and a temperature rising rate of 20° C./hr), in Example 7 in which the largest molded article (having a volume of 28 L) was fired, all hundred of obtained honeycomb structures had no cracks. Meanwhile, in Comparative Example 6 where the smallest molded article (having a volume of 3 L) was fired and Comparative Example 7 where the medium-sized article (having a volume of 15 L) was fired, all hundred of honeycomb structures obtained in each of Comparative Examples 6 and 7 had cracks, indicating that rates of occurrence of cracks were 100%.

In contrast, as shown in Table 4 and FIG. 10, when the smallest molded article (having a volume of 3 L) containing a reduced amount, i.e., 5 wt %, of carbon in Example 8, the medium-sized molded article (having a volume of 15 L) containing a medium amount, i.e., 10 wt %, of carbon in Example 9 and the largest molded article (having a volume of 28 L) containing the largest amount, i.e., 15 wt %, of carbon in Example 7 were fired at 400° C. to 1,200° C. and a temperature rising rate of 20° C./hr, all hundred honeycomb structures manufactured by any of the manufacturing methods had no cracks, indicating that rates of occurrences of cracks were 0%.

Example 10

A honeycomb structure was manufactured in the same manner as in Example 1 except that molded article was fired in accordance with the temperature raising program 2 shown in Table 1, that a raw material containing 10.0 parts by mass of carbon (average particle diameter: 53 μm) and 2.4 parts by mass of a foamed resin (average particle diameter: 50 μm) based on 100 parts by mass of the cordierite-forming raw material was used, and the manufactured honeycomb structure had volume of 15 L (size: φ250 mm×L300 mm).

(Determination of Porosity)

The porosity each of the honeycomb structures of Comparative Example 7, and Examples 9 and 10, was calculated from the total pore volume of a specimen cut out from each structure of Comparative Example 7, and Examples 9 and 10, determined by using a mercury pressure injection type porosimeter produced by Micro-metrics Co., Ltd., taking that the true specific gravity of codierite is 2.52 g/cc.

Production conditions and evaluation results are shown in Table 5 below.

TABLE 5

|  | Vol. (L) | Amount of Carbon added (mass %) | Amount of foamed resin added (mass %) | Temp. Raising Program | Difference in Temp. between Firing environment & Central Portion of Molded Article (Max) | Rate of Occurrence of Cracks (%) | Site Where Cracks Occurred | Porosity after firing (%) |
|---|---|---|---|---|---|---|---|---|
| Com. Ex. 7 | 15 | 15 | 2.0 | No. 2 | −180° C. | 100 | Near Central Portion | 61 |
| Ex. 9 | 15 | 10 | 2.0 | No. 2 | −120° C. | 0 | — | 58 |
| Ex. 7 | 15 | 10 | 2.4 | No. 2 | −130° C. | 0 | — | 58 |

(Evaluation)

The honeycomb structure of Comparative Example 7 was fired in accordance with the temperature raising program 2, using 15% by mass of carbon. The temperature difference at the outer surface to the central portion of the structure, i.e., firing environment was −180° C. and, thus, the crack formation was observed in the central portion of the honeycomb structure. This could be caused by an earlier shrinkage at the central portion of the structure that was brought by a relatively higher temperature at the central portion within a temperature range wherein the shrinkage of the raw material usually may occur. In the case of Example 9, crack formation was prohibited. This came about from the fact that the heat generated in the central portions of the structure was reduced due to the reduced amount of carbon used (10% by mass), thereby the temperature difference at the outer surface to the central portion of the structure became −120° C. However, a small reduction in the porosity of from 61% to 58% was observed in Example 9 because of a small reduction in an amount of carbon. In the case of Example 10 wherein a foamed resin of a relatively increased amount (2.4% by mass) was used, the honeycomb structure having the porosity of 61% same as that of Comparative Example 7 was obtained without the formation of cracks.

Example 11

A honeycomb structure was manufactured in the same manner as in Example 1 except that molded article was fired in accordance with the temperature raising program 5 shown in Table 1, a raw material containing 15.0 parts by mass of carbon (average particle diameter: 53 μm) based on 100 parts by mass of the cordierite-forming raw material was used, and the manufactured honeycomb structure had volume of 15 L (size: φ250 mm×L300 mm).

Example 12

A honeycomb structure was manufactured in the same manner as in Example 1 except that molded article was fired in accordance with the temperature raising program 5 shown in Table 1, a raw material containing 15.0 parts by mass of carbon (average particle diameter: 53 μm) and 1.6 parts by mass of a foamed resin (average particle diameter: 50 μm) based on 100 parts by mass of the cordierite-forming raw material was used, and the manufactured honeycomb structure had volume of 15 L (size: φ250 mm×L300 mm).

Production conditions and evaluation results are shown in Table 6 below.

resin, foamed resin or the like burnable at a temperature below 400° C. is preferable to accelerate the temperature rising rate. However, a special attention should be paid to choose properly the amounts of carbon burnable within a temperature range of 400° C. to 1,200° C. and the pore-forming agent such as foamable resin, foamed resin or the like burnable at a temperature below 400° C. not so as to make the central portions of the honeycomb structures molten at the firing maximum temperature more than 1400° C. This is because the temperature at the central portion of the honeycomb structure goes up to a melting point of cordierite or more due to the burning of carbon that remained unburned in the central portion thereof within the temperature range of 400° C. to 1,200° C. when the environment temperature reaches the highest range of 1,400° C. or more.

TABLE 6

| | Vol. (L) | Amount of Carbon added (mass %) | Amount of foamed resin added (mass %) | Temp. Raising Program | Difference in Temp. between Firing environment & Central Portion of Molded Article (Max) | Rate of Occurrence of Cracks (%) | Site Where Cracks Occurred | Porosity after firing (%) |
|---|---|---|---|---|---|---|---|---|
| Com. Ex. 3 | 15 | 10 | 2.0 | No. 5 | +60° C. | 100 | Near Outer Surface Portion | 58 |
| Ex. 11 | 15 | 15 | 2.0 | No. 5 | +10° C. | 0 | — | 61 |
| Ex. 12 | 15 | 15 | 1.6 | No. 5 | +20° C. | 0 | — | 58 |

(Evaluation)

The honeycomb structure of Comparative Example 3 was fired in accordance with the temperature raising program 5, using 10% by mass of carbon. The temperature difference at the outer surface to the central portion of the structure was +60° C. and, thus, crack formation was observed on the outer surface portion of the honeycomb structure. The cause of this crack formation could be considered to be that the outer surface portions shrunk earlier due to the higher temperature around the outer surface portions, compared with the other portions. In the case of Example 11, crack formation was prohibited. This came about from the fact that the heat generated in the central portions of the structure was increased due to the increased amount of carbon used of 15% by mass, thereby the temperature difference at the outer surface to the central portion of the structure became +10° C. Additionally, a small increase in the porosity of from 58% to 61% was observed in Example 11. In the case of Example 12 wherein a foamed resin of relatively reduced amount (1.6% by mass) was used, the honeycomb structure having a reduced porosity of 58% equal to that of Comparative Example 3 was obtained without the formation of cracks.

When a comparison is made between Examples 9 and 12, one may recognize that the honeycomb structures having a volume of 15 L (size: φ250 mm×L300 mm) and a porosity of 58% were produced without forming the cracks in both Examples. However, if the productivity is taken into consideration, one may say that Example 12 is preferable since the time required for firing in this case can be shortened. This is because the temperature rising rate in the temperature range of 400° C. to 1,200° C. is fast. That is, one may say that the employment of an increased amount of carbon burnable within a temperature range of 400° C. to 1,200° C. with a reduced amount of a pore-forming agent such as foamable As described above, according to the method for manufacturing a porous ceramic structure of the present invention, when a high porosity ceramic structure is manufactured as well as when a low porosity ceramic structure is manufactured, a porous ceramic structure can be manufactured without being cracked by firing. Particularly, in a method in which an amount of specific pore-forming agent to be added is controlled, molded articles which are different in volume or the like can be formed into high porosity porous ceramic structures without having cracks in the same firing step, and a method for manufacturing which is extremely advantageous in view of production efficiency can be provided. Further, although the method for manufacturing of the present invention can be used as a method of producing a low porosity ceramic honeycomb structure, it can be preferably used particularly as a method of producing a high porosity ceramic honeycomb structure.

What is claimed is:

1. A method for manufacturing a porous ceramic structure, comprising:
    molding a raw material containing a ceramic material capable of forming cordierite by firing as a main component and a pore-forming agent; and
    drying and firing the molded article,
    wherein the raw material is one containing at least two kinds of pore-forming agents having different burning temperature ranges,
    the temperature of a firing environment is raised while controlling the temperature of a firing environment within a range of −150° C. to +50° C. from the temperature of the central portion of the molded article within a range where at least a portion of the molded article reaches 800° C. to 1,200° C., the control of the temperature is done by selecting an amount of a first pore forming agent which burns at 400° C. to 1,200° C., and selecting an amount of a second pore forming agent which burns at temperatures below 400° C., to control the temperature of the firing environment to within a range of −150° C. to +50° C. from the temperature of the central portion of the molded article, the control of the temperature is done by decreasing the amount of the first pore-forming agent, but increasing the amount of the second pore-forming agent when the temperature of firing environment is expected to be lower than the range of −150° C. to +50° C. in comparison with the temperature of the central portion of the molded article, and the molded article contains 5 to 25 parts by mass of carbon and 1 to 5 parts by mass of a foamable resin or foamed resin based on 100 parts by mass of the cordierite-forming raw material.

2. The method of claim 1, wherein the first pore-forming agent is carbon.

3. The method of claim 1, wherein the second pore-forming agent is at least one of wheat flour, starch, a phenol resin, a foamable resin, a foamed resin, a polymethyl methacrylate and a polyethylene terephthalate.

4. The method of claim 1, wherein the temperature of firing environment is raised at a rate of 10 to 80° C./hr when the temperature is within a range of 400° C. and 1,200° C.

5. The method of claim 1, wherein a firing environment in which the molded article is fired contains 7 to 17% by volume of oxygen when the temperature is within a range of 400° C. and 1,200° C.

6. The method of claim 1, wherein the porous ceramic structure is a honeycomb structure.

7. The method of claim 1, wherein the porous ceramic structure has a porosity of 50% or more.

8. A method for manufacturing a porous ceramic structure, comprising:

molding a raw material containing a ceramic material capable of forming cordierite by firing as a main component and a pore-forming agent; and drying and firing the molded article, wherein the raw material is one containing at least two kinds of pore-forming agents having different burning temperature ranges, the temperature of a firing environment is raised while controlling the temperature of a firing environment within a range of −150° C. to +50° C. from the temperature of the central portion of the molded article within a range where at least a portion of the molded article reaches 800° C. to 1,200° C., the control of the temperature is done by selecting an amount of a first pore forming agent which burns at 400° C. to 1,200° C., and selecting an amount of a second pore forming agent which burns at temperatures below 400° C., to control the temperature of the firing environment to within a range of −150° C. to +50° C. the temperature of the central portion of the molded article, the control of the temperature is done by increasing the amount of the first pore-forming agent, but decreasing the amount of the second pore-forming agent when the temperature of a firing environment is expected to be higher than the range of −150° C. to +50° C. in comparison with the temperature of the central portion of the molded article, and the molded article contains 5 to 25 parts by mass of carbon and 1 to 5 parts by mass of a foamable resin or foamed resin based on 100 parts by mass of the cordierite-forming raw material.

9. The method of claim 8, wherein the first pore-forming agent is carbon.

10. The method of claim 8, wherein the second pore-forming agent is at least one of wheat flour, starch, a phenol resin, a foamable resin, a foamed resin, a polymethyl methacrylate and a polyethylene terephthalate.

11. The method of claim 8, wherein the temperature of firing environment is raised at a rate of 10 to 80° C./hr when the temperature is within a range of 400° C. and 1,200° C.

12. The method of claim 8, wherein a firing environment in which the molded article is fired contains 7 to 17% by volume of oxygen when the temperature is within a range of 400° C. and 1,200° C.

13. The method of claim 8, wherein the porous ceramic structure is a honeycomb structure.

14. The method of claim 8, wherein the porous ceramic structure has a porosity of 50% or more.

15. A method for manufacturing a porous ceramic structure, comprising:

molding a raw material containing a ceramic material capable of forming cordierite by firing as a main component and a pore-forming agent; and drying and firing the molded article, wherein the raw material is one containing at least two kinds of pore-forming agents having different burning temperature ranges, the temperature of a firing environment is raised while controlling the temperature of a firing environment within a range of −150° C. to +50° C. from the temperature of the central portion of the molded article within a range where at least a portion of the molded article reaches 800° C. to 1,200° C., and wherein the control of the temperature is done by selecting an amount of a first pore forming agent which burns at 400° C. to 1,200° C., and selecting an amount of a second pore forming agent which burns at temperatures below 400° C., to control the temperature of the firing environment to within a range of −150° C. to +50° C. from the temperature of the central portion of the molded article.

* * * * *